3,429,668
SEPARATING ALKALI METAL HALATES FROM HALIDES BY ADDITION OF AMMONIA
Remigius A. Gaska and Robert D. Goodenough, Midland, Mich., assignors to The Dow Chemical Company, Midland, Mich., a corporation of Delaware
No Drawing. Filed Apr. 8, 1966, Ser. No. 541,058
U.S. Cl. 23—296     7 Claims
Int. Cl. B01d 9/00

This invention relates to a method of separating halate salts from aqueous solutions containing halide salts, and more particularly pertains to the separation of alkali metal halates whose solubility in water on a weight basis is not as great as that of the corresponding halides in water, from aqueous solutions containing these salts by adding sufficient ammonia to precipitate, selectively, a major proportion of the halate salt and at most only a small porportion of the halide salt and separating the precipitate from the mixture.

Prior to this invention, alkali metal halates of the type defined were separated from the corresponding halides by concentrating aqueous solutions until they were substantially saturated with the halide. The precipitate of the halate salts which forms on cooling the aqueous solution is either contaminated with considerable amount of halide salt or if the halate salt precipitate is comparatively pure, a fairly large amount of the halate salt remains in solution. To make a satisfactory halate salt requires either recrystallization of the contaminated product or low initial recovery because of excessive loss in the mother liquor.

According to this invention, liquid or gaseous ammonia or aqueous $NH_4OH$ is added to an aqueous mixture of an alkali metal halate and alkali metal halide. In fact, it is not necessary to have the combined salts in solution, but rather, a solid composition may be used in the process. The amount of $NH_3$ or $NH_4OH$ added can range between 10–50% by weight of the combined weight of $NH_3$ and water. The preferred range is from about 15–30% ammonia by weight of the combined weight of $NH_3$ and water. The alkali metal halate can all be in solution or some of it can be present as a precipitate. It is preferred to have the aqueous solution near its saturation point in regard to alkali metal halate.

Gaseous or liquid $NH_3$ is preferred over aqueous $NH_4OH$ because of the ease with which the most desirable concentration in the system is attained and the avoidance of the dilution effect of aqueous $NH_4OH$.

A temperature of 0–50° C. can be employed, but preferably a temperature of 15–30° C. is used, because no external heating or cooling is needed in this operating range.

Pressure has no effect on the results obtained. It is a function only of the temperature and $NH_3$ concentration used in precipitating the alkali metal halate.

The salt pairs that can be employed are:

NaI—NaIO$_3$      RbBr—RbBrO$_3$
NaBr—NaBrO$_3$      RbI—RbIO$_3$
KCl—KClO$_3$      CsCl—CsClO$_3$
KBr—KBrO$_3$      CsBr—CsBrO$_3$
KI—KIO$_3$      CsI—CsIO$_3$
RbCl—RbClO$_3$

The $NH_3$ can be readily recovered from the mother liquor and recycled to the precipitation system. The residual mother liquor from the $NH_3$ distillation can then be further evaporated and the halide recovered by crystallization.

In the event a superpure halide product is desired, the rendered halate can be passed through a reducing system and converted to the halide.

Although the invention is described by reference to batch operation, it is apparent that it can be readily adapted to a continuous system by use of known metering devices for controlling proportions of liquid or gaseous $NH_3$ or aqueous $NH_4OH$ and aqueous alkali metal halate-halide solutions that are fed to a continuous separator system.

The examples which follow are intended to illustrate but not to limit the invention. In all instances, parts and percentages are given by weight unless otherwise specifically indicated.

Example 1

To an aqueous solution containing 3.05 parts NaIO$_3$, 20 parts NaI and the remainder water, sufficient gaseous $NH_3$ was added to the solution to provide a concentration of 15% by weight based on the total solution. The mixture was permitted to stand at 25° C. until equilibrium conditions were established. The sodium iodate crystals which precipitated were separated from the liquid. Analysis of the ammonia free liquid showed a concentration of 20% NaI and 0.3% NaIO$_3$.

Example 2

To an aqueous solution containing 2 parts KClO$_3$ and 14.5 parts KCl was added sufficient gaseous $NH_3$ to provide a concentration of 15% by weight $NH_3$, based on the total solution. The temperature of the mixture was held at 20° C. until equilibrium conditions were established. The KClO$_3$ crystals were filtered from the mixture and the filtrate analyzed 14% KCl and 0.5% KClO$_3$ on an ammonia-free basis.

Example 3

To 25.8 parts liquid ammonia held at −30° C. in a pressure vessel were added 31.1 parts of water. Thereafter, 2.1 parts NaBrO$_3$ and 26.8 parts of NaBr were added. The system was closed and permitted to warm up to 25° C., while being agitated frequently. After steady state was established, a sample of the liquid phase was removed and analyzed. It contained 33.1% NaBr and 0.91% NaBrO$_3$. On separating the crystals from the liquid phase, the wet precipitate was found to weigh 1.9 g. After washing and drying, it was analyzed and found to contain 99% NaBrO$_3$ and 0.2% NaBr.

When rubidium or cesium salt pairs are substituted for the sodium and potassium salts, the halates of these former elements can be effectively separated from the halides.

We claim:

1. A method of separating alkali metal halates selected from the group consisting of sodium iodate, sodium bromate, rubidium chlorate, rubidium bromate, rubidium iodate, cesium chlorate, cesium bromate and cesium iodate from their corresponding halides, the said halates being less soluble in water than the said halides, comprising admixing water containing said halates and said halides with between about 10 to 50% by weight, based on the combined weight of water and $NH_3$, $NH_3$ to effect precipitation of a major proportion of the alkali metal halate and separating the precipitated alkali metal halate from the mother liquor.

2. The method of claim 1 in which the alkali metal in the salt is sodium.

3. The method of claim 1 in which $NH_3$ concentration is between about 15 and about 30% on the basis defined in said claim 1.

4. The method of claim 1 in which the temperature during the precipitation step ranges from about 0 to about 50° C.

5. The method of claim 4 in which the temperature ranges from about 20 to about 30° C.

6. The method of claim 1 in which the halate is sodium bromate, the halide is sodium bromide and $NH_3$ is added in the gaseous or liquid state.

7. The method of claim 1 in which the halate is sodium iodate, the halide is sodium iodide and $NH_3$ is added in the gaseous or liquid state.

References Cited

UNITED STATES PATENTS

| | | | |
|---|---|---|---|
| 3,085,854 | 4/1963 | Meybeck | 23—302 X |
| 3,212,863 | 10/1965 | Goodenough | 23—302 X |
| 1,496,152 | 6/1924 | Dolbear | 23—297 |

FOREIGN PATENTS

| | | |
|---|---|---|
| 23,109 | 4/1931 | Netherlands. |
| 636,568 | 2/1962 | Canada. |
| 726,097 | 1/1966 | Canada. |

OTHER REFERENCES

Isbin et al.: J. Amer. Chem. Soc., March 1945, vol. 67, pp. 464–465.

Gilliot: Bull. Soc. Chim. France, March 1951, pp. 992–1002.

NORMAN YUDKOFF, *Primary Examiner.*

J. T. EMERY, *Assistant Examiner.*

U.S. Cl. X.R.

23—85, 300, 302